United States Patent [19]

Weidenhaupt et al.

[11] Patent Number: 4,878,343
[45] Date of Patent: Nov. 7, 1989

[54] REINFORCING ROPE MADE OF AT LEAST TWO DIFFERENT MATERIALS

[75] Inventors: Wolfgang Weidenhaupt, Erkelenz; Gunther Wepner, Waldfeucht-Neuhaaren; Peter Dismon, Heinsberg-Prose, all of Fed. Rep. of Germany; Mattheus G. Remijn, Velp, Netherlands

[73] Assignee: AKZO BM Arnhem, The Netherlands, Arnhem, Netherlands

[21] Appl. No.: 186,557

[22] Filed: Apr. 27, 1988

Related U.S. Application Data

[60] Division of Ser. No. 938,056, Nov. 17, 1986, Pat. No. 4,807,680, which is a continuation-in-part of Ser. No. 610,875, May 16, 1984, abandoned.

[30] Foreign Application Priority Data

May 16, 1983 [DE] Fed. Rep. of Germany ....... 3317708
Mar. 23, 1984 [DE] Fed. Rep. of Germany ....... 3410703

[51] Int. Cl.$^4$ .......................... D02G 3/48; D02G 3/12; D02G 3/36; D07B 1/06

[52] U.S. Cl. .................... 57/222; 57/212; 57/215; 57/216; 57/219; 57/220; 57/902; 152/451; 152/527; 152/556

[58] Field of Search ................. 57/212, 215, 216, 220, 57/219, 222, 902; 152/451, 527, 556, 557

[56] References Cited

U.S. PATENT DOCUMENTS

4,176,705 12/1979 Russell et al. ..................... 57/220 X
4,349,063 9/1982 Kikuchi et al. .................... 57/212 X Primary Examiner—John Petrakes
Attorney, Agent, or Firm—Michael J. Striker

[57] ABSTRACT

A composite reinforcing rope is made of a cylindrical core of twisted filaments of aromatic polyamides around which a plurality of steel wires of a rectangular configuration are coiled. The steel wires are wound side-by-side in one layer. Each wire is twisted around its own axis to such a degree that its broader side fully engages the periphery of the polyamide core. The edges of respective wires are rounded whereby the convex narrow dides of adjoining wires contact one another substantially along a line.

19 Claims, 7 Drawing Sheets

REINFORCING ROPE MADE OF AT LEAST TWO DIFFERENT MATERIALS

This application is a division of application Ser. No. 938,056 filed Nov. 17, 1986, now U.S. Pat. No. 4,807,680, which is a continuation-in-part of application Ser. No. 610,875 filed May 16, 1984 (now abandoned).

BACKGROUND OF THE INVENTION

The present invention relates to a reinforcing rope made of at least two components, whereby one component consists of steel wires and the second component of fibres of p-aromatic polyamides.

A reinforcing rope of this kind is described in U.S. Pat. No. 4,176,705. The prior art reinforcing rope is composed of a plurality of twisted strands of round steel wires coiled around a multi-filament core of aromatic polyamide. In order to keep the steel wire strands in mutually spaced relationship, breaking strength of respective strands is set equal to that of the core. However, if such a prior art rope is exposed to a tensile load, the core filaments of aromatic polyamide share the load with the steel wires whereby the polyamide core filaments are exposed to extremely strong transverse forces exerted by the steel strands. The effect of the transverse forces is very disadvantageous because the larger is the tensile load the larger is the extension and hence the stronger is the effect of transverse forces.

As known, steel wires have a lower breaking extension than have the filaments of aromatic polyamide. Consequently, the prior art composite reinforcing rope can be exposed to such a load only at which its extension does not exceed the breaking extension of the steel wire strands. If this limit load is exceeded, the steel wires rupture and the entire load is taken up by the polyamide core which in turn immediately exceeds its own breaking elongation and ruptures too. In other words, the known composite rope breaks when its extension corresponds to the breaking extension of its steel wire component in spite of the fact that the latter is distinctly below the breaking elongation of the polyamide core.

Since the breaking elongation of the prior art reinforcing rope is smaller than the sum of breaking elongations of its component parts, the excellent strength of the core filaments of aromatic polyamide is utilized only partially.

SUMMARY OF THE INVENTION

It is therefore a general object of this invention to avoid the above described disadvantages.

More particularly, it is an object of this invention to provide an improved composite reinforcing rope whose breaking elongation matches that of its polyamide filament core.

Another object of this invention is to improve the design of the composite reinforcing rope in such a manner that the breaking elongation of its steel wires component approximates that of its core of polyamide filaments and, at the same time, the steel wires apply against the core filaments only minimum transverse forces during a tensile load. The composite reinforcing rope of this invention breaks only under a force which corresponds approximately to the sum of breaking forces of respective component parts. For example, if the component steel wires have a breaking strength of 300N and the component filaments of aromatic polyamide have a breaking strength of 650N, then the reinforcing rope of this invention has a breaking strength of about 950N.

In keeping with these objects and others which will become apparent hereafter, one feature of the invention resides in the provision of a reinforcing rope made of at least two components of which the first component consists of steel wires and the second component of filaments of aromatic polyamide whereby the polyamide filaments form a core of a substantially circular cross-section around which the steel wires are coiled, each of the steel wires having an approximately rectangular cross-section with rounded edges and defining opposite broad and narrow sides and the broad sides of respective coiled steel wires extending in the circumferential direction of corresponding sections of the polyamide filaments core. In the preferred embodiment, material of the aromatic polyamide core is particularly poly-(p-phenylenterephthalamide).

If has been found that the structure of the composite rope of this invention surprisingly results in a substantial increase of the breaking elongation of the steel wires component.

Preferably, the steel wires are made of drawn steel having 0.6 to 0.9% by weight of carbon contents. Steel wires of round cross-section made of steel material of the aforementioned carbon contents have a highly tensile strength between 2,500 to 3,500 N/mm$^2$ and a breaking elongation of about 2%.

Since such very strong round wires are suitable for withstanding high loads, they are employed as component parts in composite reinforcing ropes which are designed to exhibit a high ultimate tensile strength. The specific tensile strength of the reinforcing rope related to its own weight is advantageously increased by using the before described round wires.

Depending on the number of windings or twists of such steel wires of a rectangular cross-section with rounded edges, per a length unit of the core, the resulting composite rope of this invention may surprisingly achieve a breaking elongation over 4%. Preferably each of the steel wires is coiled around the core and twisted along own longitudinal axis with 40 to 200 windings and twists per meter. The resulting rope has approximately a circular cross-section.

In order to reduce frictional wear between adjoining steel wires resulting in the so-called fretting corrosion, it is advantageous when adjoining steel wires are in contact with one another along a line. In establishing such linear contact with steel wires having a rectangular cross-section, it is necessary that the edges of the wires be well rounded.

The cross-sectional area of each steel wires is preferably between 0.03 and 0.2 mm$^2$ and the ratio of the broad sides to the narrow side of each wire cross-section is between 1 and 4. It is namely possible to use steel wires having an approximately square cross-section (ration of rectangular sides equals 1), with rounded edges or corners.

The arrangement of steel wires in the outer layer of the reinforcing rope has the advantage that the steel wires which are usually coated with brass, have a particularly strong adherence to the elastomeric material. By the provision of steel wires of a rectangular cross-section with rounded corners and by orienting the broad sides of the wires in circumferential direction of the approximately cylindrical center core, an approximately circular cross-section of the rope is ensured. By rounding the edges of the rectangular steel wires a contact along a line is established between the adjoining wires so that frictional areas are reduced in advantageous manner to minimum.

In the reinforcing rope constructed in accordance with this invention it has been found as surprising that under tensile load the elongation of the steel wires occurs exclusively due to the material deformation thereof whereby the proportion of the structural elongation of the steel wires is very low amounting only to about 0.1 to 0.2% of the total maximum elongation, and both components in the reinforcing rope take up substantial equal tensile forces even in the lower range of the load. By adjusting the number of windings and twists which are applied to the steel wires and which amount preferably from 40 to 200 windings and twists per meter, and also by twisting the core of aramid fibers the two components of the rope are adjusted approximately to the same maximum strength. By this arrangement the two components of the reinforcing rope of this invention perform the supporting function up to the higher breaking elongation of the polyamide core and break after a substantially equal deformation. In the reinforcing rope constructed according to this invention the tensile forces of the two components are added and consequently the quality of materials of all components of the rope is fully utilized for any load.

An approximately rectangular cross-section of a steel wire can be achieved by flat rolling a round wire whereby the shaping or rolling of the narrow sides of the resulting rectangle is dispensed with.

It has been proven as advantageous when the fibers from aromatic polyamides are twisted together into a filament yarn so that the fibers are arranged in a more compact form. By twisting the fibers into yarns it is insured that in further processing a circular cross-section of the yarn is preserved and is not flattened.

Preferably, two or more filament yarns are further twisted together whereby the direction of twisting of the fibers in each yarn is opposite to the direction of twisting of the yarns in the core.

With advantage, the difference between the length of a lay or twists of the filament yarns and the twists of the aromatic polyamide filaments in each yarn is between 50 to 200 twists per meter. For instance, if a strand of filament yarns is twisted in S-direction with 140 twists per meter, then the filaments in individual yarns are twisted in Z-direction with 50 twists per meter. Accordingly, the difference between the two lengths of lay is 90 twists per meter. Due to the minute twisting difference of 50 to 200 twists per meter between the aromatic polyamide filaments the breaking elongation of the resulting rope is changed only insignificantly and simultaneously the breaking strength is slightly increased.

It has been found that the breaking or maximum strength of the entire reinforcing rope is increased when the winding and the twist of steel wires and the twist of the aromatic polyamide yarns have the same direction.

According to another feature of this invention the filaments of aromatic polyamide are exposed to a lubricant whereby fatigue of the aramid fibers which may result due to the outer friction between the aramid fibers themselves or between the aramid fibers and the steel wires, is reduced. As a lubricant can be employed all means which have the following properties: the lubricant must withstand also the pretreatment at about 140° to 200° C. after vulcanization for example; lubricant must not exhibit any chemical aggressivity against steel and aramid leading to the corrosion of the steel for example; and must not have any negative effect on the binding between the reinforcing rope and the elastomeric material in which the rope is embedded. A suitable material for use as a lubricant is for example the product of Firma Akzo Chemie Dueren, Germany, commercially available under designation P0229. It has been found that the advantageous proportion of this product is 1 to 10% by weight of the filaments of aromatic polyamide.

In the preferred embodiment of this invention, the reinforcing rope has 10 to 40% by weight, preferably 15 to 25% by weight of filaments of aromatic polyamide. This particular combination of material components of the reinforcing rope has a substantially lower meter-weight for a given maximum or tensile strength in comparison with a reinforcing rope made exclusively of steel wires. The reinforcing rope of this invention has approximately of a circular cross-section.

In the preferred embodiment of this invention there are between five and thirty steel wires, preferably twelve, eighteen or twenty four steel wires wound around the core of aromatic polyamide filaments. The number of steel wires of rectangular cross-section depends on the desired strength and thickness of the reinforcing rope in which the steel wires completely cover the periphery of the core of aramid filaments.

In a further modification of this invention, the jacket of the reinforcing rope is provided with a further wrapping wire which is helically wound on the steel wires. This additional wrapping wire is preferably again a steel wire of an approximately rectangular cross-section with rounded edges.

As a rule, the reinforcing rope of this invention has a specific tensile strength between 500 to 900 N/ktex. The specific tensile strength relates to a strength per a meter weight.

The advantageous field of application of the reinforcing rope of this invention is in the manufacture of tires for motor vehicles conveyor belts and driving belts. The reinforcing ropes proved particularly useful in belts of a radial tire for motor vehicles, particularly for heavy-duty trucks, road construction machines, airplanes or tractors.

By virtue of the simultaneous effect of both components the resulting reinforcing rope has advantageous qualities of both types of employed materials. In summary, the reinforcing rope has a high strength, sufficient stiffness aand shape stability when embedded in an elastomeric product, a satisfactory resistance against fatigue and a satisfactory heat conducting quality. At the same time the susceptibility to corrosion is substantially reduced. Fretting corrosion practically does not occur. Weight per meter in the rope of this invention in comparison with conventional ropes of steel wires is substantially reduced and consequently eccentric forces are lower when the reinforcing ropes are employed in cord tires for motor vehicles.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
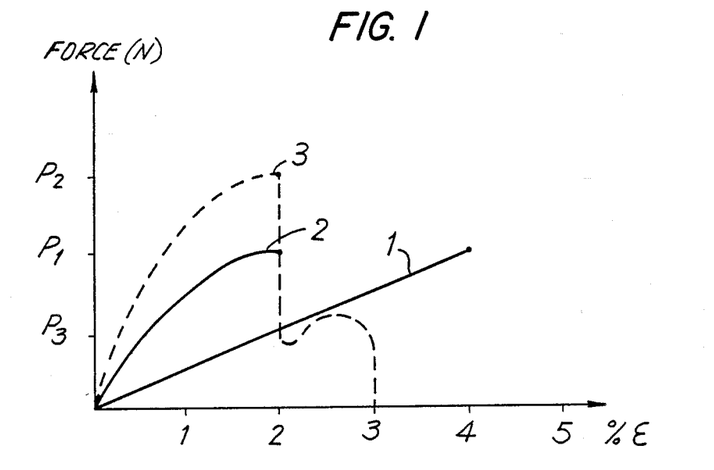
FIG. 1 is a force-deformation or elongation diagram of conventional reinforcing rope of steel and aramid, and of its separate component materials.

FIG. 1 illustrates in dashed line a stress-deformation (or elongation) diagram 3 of aa prior art reinforcing rope made of aramid filaments and of steel wires. Line 1 shows the deformation or elongation behavior of p-aromatic polyamide filaments (aramid) and line 2 relates to the elongation behavior of conventional steel wires.

The steel wires and the aramid have a maximum tensile strength $P_1$ each, whereby the steel wires have a breaking elongation of about 2% and the aramid fibers a breaking elongation of about 4%. In a reinforcing rope made of the two component materials the resulting stress-deformation curve 3 at the beginning has a source at which forces corresponding to equal deformations of respective components, are added. When the deformation reaches about 2%, then the maximum tensile strength of the reinforcing rope corresponds to a force $P_2$ which equals to the sum of forces $P_1$ and $P_3$, wherein $P_3$ corresponds to a tensile load at which the aramid filaments extend about 2%. Since at this point the breaking elongation of steel wires (curve 2) is reached, the force applicable to the rope drops abruptly with further elongation. It is evident from the diagram that the maximum breaking elongation of the aramid filaments 1 has not been reached and the maximum tensile strength of the aramid filaments does not contribute to the overall strength of the rope at this point.

Figure 2:
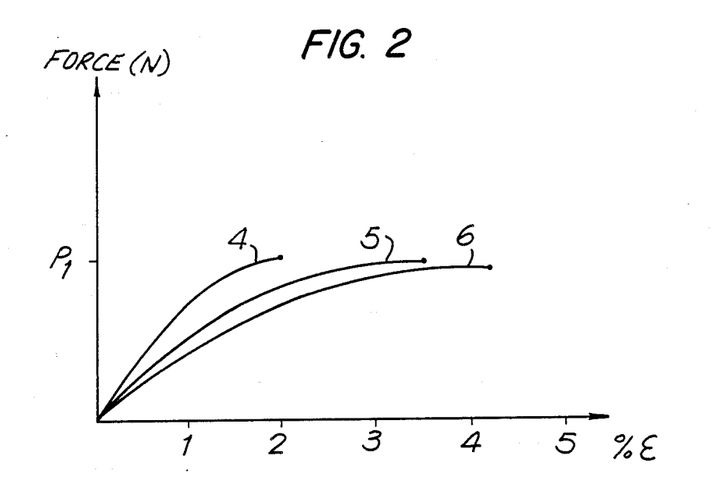
FIG. 2 is a force-deformation diagram of three differently treated steel wires.

FIG. 2 shows stress-elongation curves of three different kinds of steel wires. Curve 4 refers to the elongation behavior of a steel wire whose cross-section is approximately rectangular but which is not twisted. When this wire is provided with about 90 twists per meter, then a force-elongation curve 5 will result while at 150 twists per meter the curve 6 is obtained. From curve 4 it will be seen that an untwisted rectangular steel wire has the same behavior as the steel wire according to curve 2 is FIG. 1, namely it has the maximum breaking force $P_1$ and ultimate or breaking elongation of about 2%. However, when this wire is provided with 90 twists per meter, the breaking elongation increases to about 3,5% while the maximum tensile strength or breaking force of the wire is only slightly reduced to a value which amounts to about 97% of $P_1$. If the same wire is provided with 150 twists per meter, there results a breaking elongation of about 4% and the breaking force drops to about 96% of $P_1$.

Figure 3:
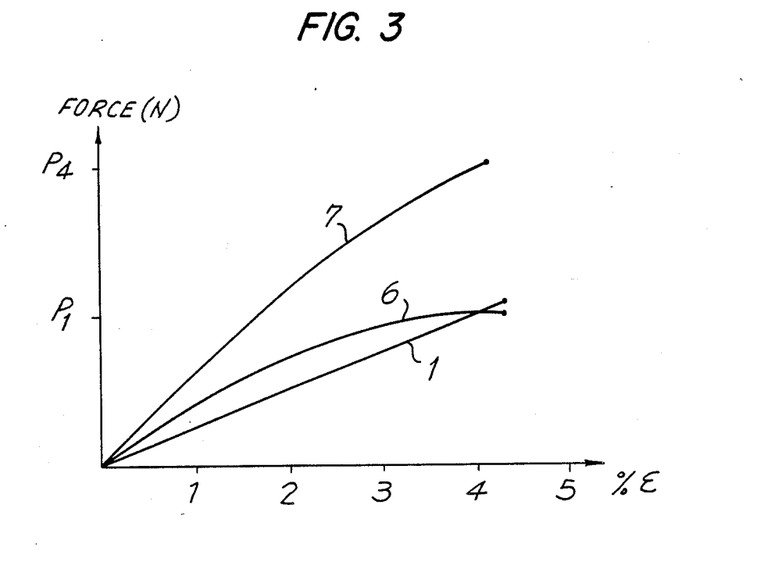
FIG. 3 is a force-deformation diagram of a reinforcing rope of this invention, and of its component materials.

If the twisted rectangular steel wires are employed in a reinforcing rope in combination with aramid filaments, there results a force-elongation curve 7 shown in FIG. 3. For comparison FIG. 3 also illustrates stress-elongation curve 1 of aramid filaments and curve 6 of a steel wire having 150 twists per meter and an approximately rectangular cross-section. From this comparison it is evident that the breaking force $P_4$ of the reinforcing rope of this invention equal to the sum of maximum breaking forces $P_1$ of its both component materials. In other words, $P_4$ equals $2P_1$ whereby the maximum or breaking elongation or deformation of the reinforcing rope of this invention is about 4%.

Figure 4:
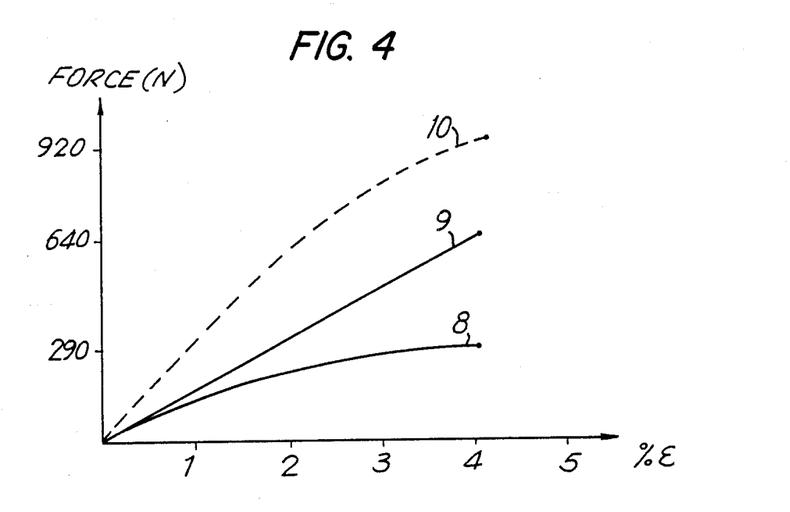
FIG. 4 is a force-deformation diagram of another embodiment of the reinforcing rope of this invention according to Example 1.

FIG. 4 shows force-elongation curves 10 of a reinforcing rope of this invention and corresponding curves 9 and 8 of its component materials, namely of a flat steel wire produced by flat rolling of a round wire of a diameter of 0.25 mm to a thickness of 0.2 mm whereby the area of the resulting approximately rectangular cross-section corresponds to the cross-sectional area of the round wire. The second component material are filaments of a p-aromatic polyamide having a strength of two times $1680_{dtex}$ f 1,000 (2 yarns with a titer of $1680_{dtex}$, whereby each yarn consists of 1,000 filaments). Both components are provided with 60 twists per meter resulting in the case of the steel wires into a breaking elongation of about 4% and breaking force 290N and, in the case of aramid filaments, also a breaking elongation of about 4%, and a breaking force 640N. The reinforcing rope made of these component materials has also a breaking elongation of about 4% whereby its breaking strength or force has a value 920N. Instrument which was used for testing the tensile strength of this rope had in the range of 1,000N a testing accuracy of about ±10N; from the measured value of the tensile strength or breaking force of 920N of the rope it will be seen that the measured value equals substantially to the sum of the breaking forces of the respective material components (640N+290N). Hence, in the reinforcing rope of this invention, both material components participate in the load carrying function up to the breakage of the stronger component.

EXAMPLES

Figure 5:
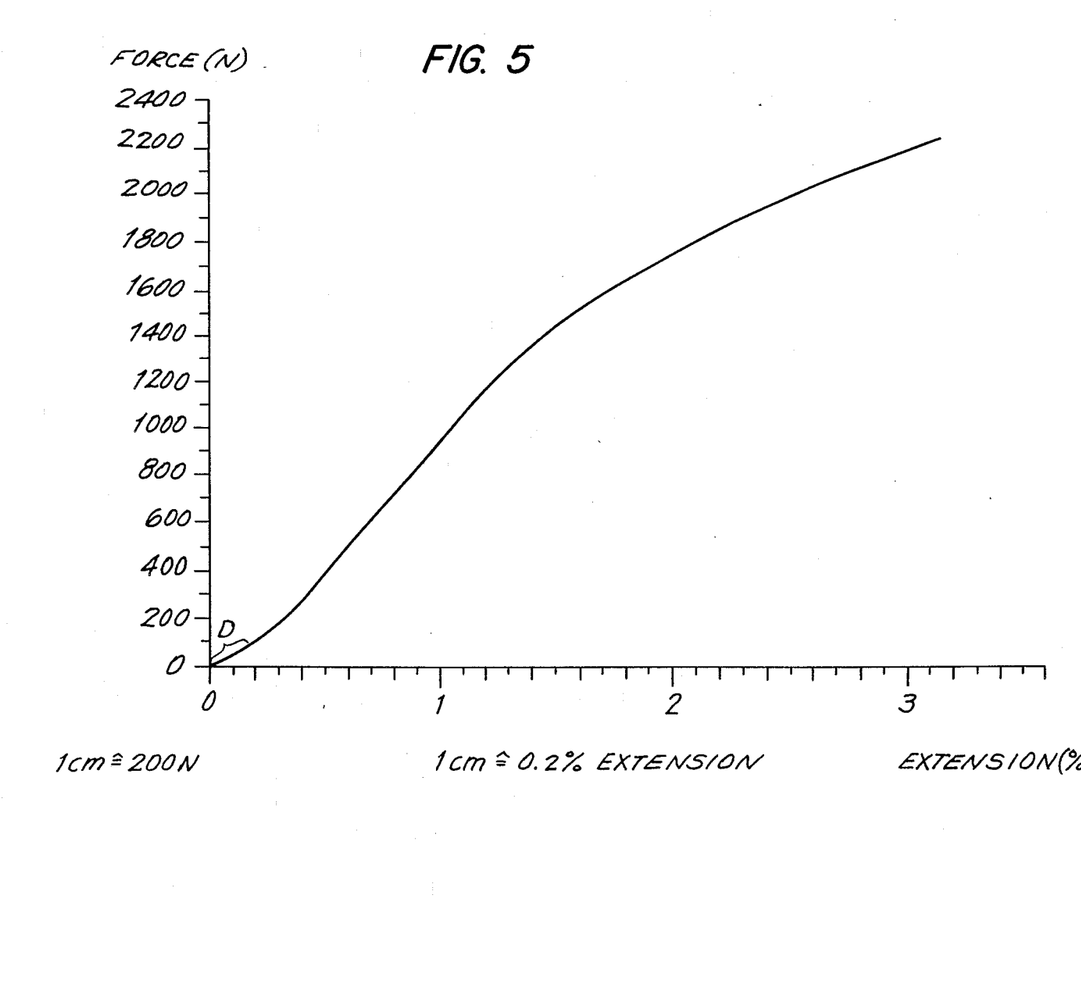
FIG. 5 is a force-deformation diagram of the reinforcing rope of this invention according to Example 1.
Figure 6:
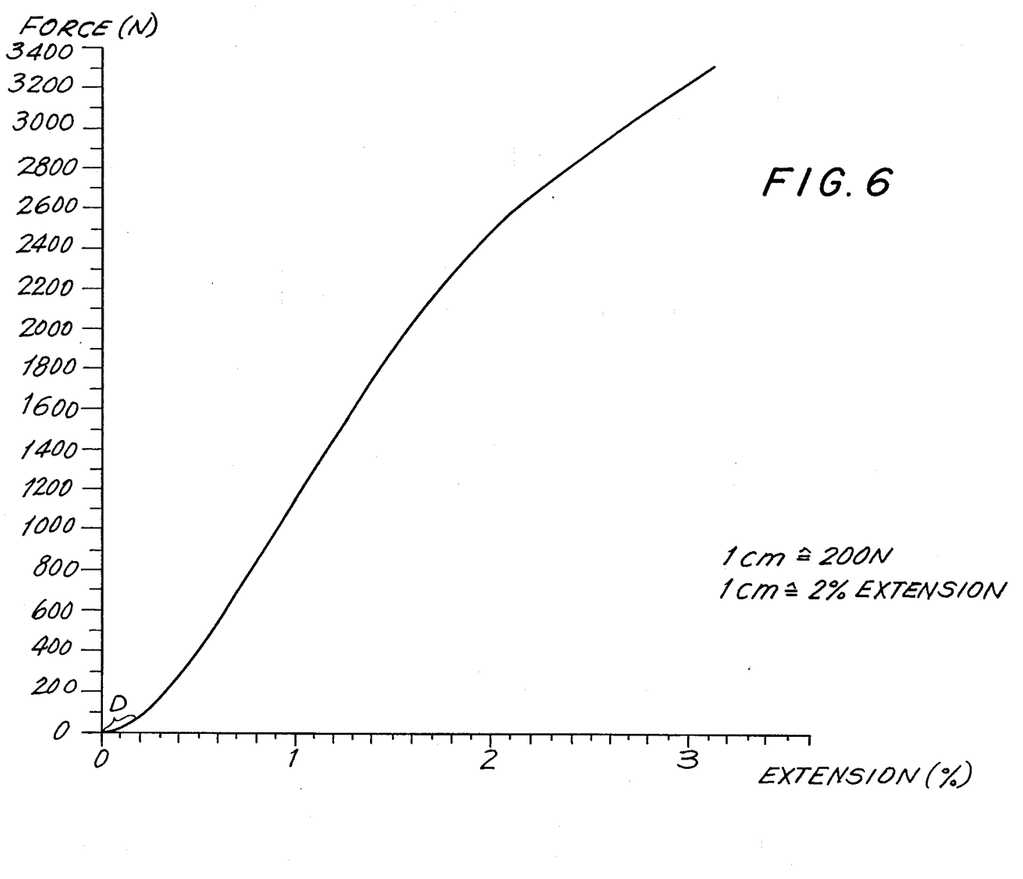
FIG. 6 is a force-deformation diagram of a reinforcing rope of this invention according to Example 2.

In the following tables I and II reinforcing ropes made in accordance with this invention are compared with a standard rope of round steel wires or with an aramid cord. The force-elongation behavior of the novel reinforcing rope according to Table I is shown in FIG. 5 and the behavior of the novel reinforcing rope according to Table II in illustrated in FIG. 6. In both examples, steel wires have a carbon content of 0.7% and a tensile strength of the starting round wires is 2700 $N/mm^2$. In the row "designation of construction" $A_r$ means aramid. The designation 0.22 F means the steel wires of an approximately rectangular cross-section with rounded edges which have been produced by flat rolling of a round wire of a diameter of 0.22 mm whereby the cross-sectional area of the round wire is approximately the same as that of the resulting flat steel wires with rounded edges. In the row "Steel wire cross-section" the diameters of starting round wires are indicated which have been flat rolled to a given thickness of a substantially rectangular steel wire with rounded edges. For example, the corresponding data in Table I indicate that a round wire of 0.22 mm in diameter has been rolled to a thickness of 0.17 mm. The expression "$4 \times 1680_{dtex}$ 1,000" means that four filaments yarns of a meter weight of $1680_{dtex}$ and 1,000 filaments are employed. The designation 50 Z/140 S means that the individual filaments or individual steel wires are first twisted in Z direction with 50 twists per meter to form filament yarns or wire strands whereupon the yarns or strands are twisted in S direction with 140 twists per meter.

Figure 7:
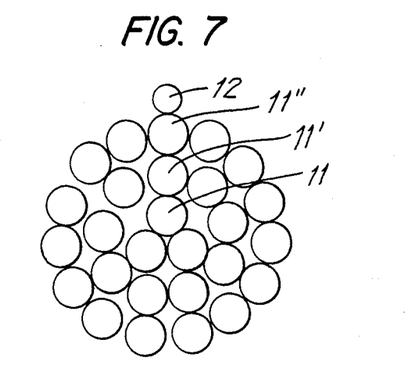
FIG. 7 is a cross-section of a prior art reinforcing rope made of steel wires.

A cross-section of a prior art reinforcing rope of steel wires which serves for comparison in Table II is illustrated in FIG. 7. In this standard construction, three round wires 11 form a core; nine round wires 11' are wound in a second layer around the core, and fifteen round wires 11" are arranged in a third layer. The rope is made of round steel wires 11, 11' and 11" has each having a diameter of 0.22 mm (Table II). Wrapping wire 12 of a diameter of 0.15 mm is helically wound around the rope over its entire length.

Figure 8:
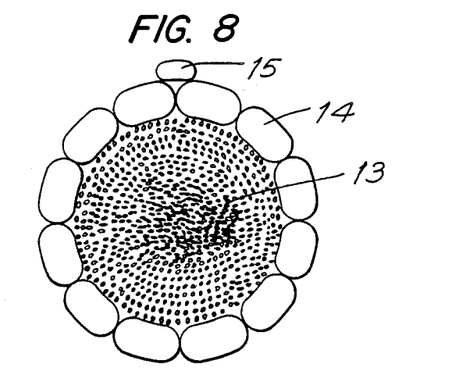
FIG. 8 is a cross-section of a reinforcing rope of this invention according to claim 2.

The reinforcing rope of this invention specified in Table II is illustrated in cross-section in FIG. 8. Reference numeral 13 denotes core filaments of aromatic polyamide constituting the second component material of the rope. The structure of the second component is as follows: at the start 1,000 filaments of aromatic polyamide of a weight of $1680_{dtex}$ are twisted together into a filament yarn having 50 twists per meter in Z direction. Two of the starting filament yarns are again twisted together with 60 twists per meter in S direction. Then strands consisting of three filament yarns are twisted in S direction. The difference between the direction of twisting of the filament yarns or threads and the direction of twisting of the initial filaments of aromatic polyamide thus amounts to 120 twists per meter. The first component materials are steel wires 14 of a substantially rectangular cross-section with rounded corners. In this example, twelve steel wires 14 are arranged side by side and coiled around a cylindrical core formed by the filaments of the second component whereby the wires 14 are simmultaneously twisted about their own axes in such a manner that their broad sides are oriented in circumferential direction of the core. The resulting reinforcing rope has an approximately circular cross-section and the adjoining rounded narrow sides of the wires contact each other substantially along a line only. The entire reinforcing rope is helically wrapped around by a wrapping wire 15 which also has a substantially rectangular cross-section with rounded corners. The steel wires 14 have been produced by rolling a round wire of a diameter 0.25 mm to a thickness of 0.19 mm. The wrapping wire 15 is also produced by flat rolling a round wire of a diameter 0.15 mm to a thickness of 0.10 mm.

It is apparent from Tables I and II that in the reinforcing rope according to this invention the breaking elongation or deformation corresponds almost to that of a pure aramid cord whereas the breaking elongation of a comparison rope made entirely of steel wires is less by about ½.

In computing the breaking forces the following factors must be taken into account: the number of filaments in the comparative aramid cord is twice as large as the number of aramid filaments in the reinforcing rope of this invention. Accordingly, the proportion of the tensile strength of the aramid filaments in the rope of this invention is only one-half of the tensile strength of the aramid cord used for comparison. In Table I the maximum tensile strength or maximum breaking force of the comparison aramid cord is 2400N whereas in the reinforcing rope of this invention the maximum breaking force of the aramid filaments is 1200N (Table II: aramid cord—3600N, the proportion of aramid filaments in the rope of this invention is 1800N). The maximum breaking force of the comparison rope made entirely of steel wires amounts according to Table I to 1700N at a meter weight 6.14 ktex whereby a specific maximum breaking strength 277 N/ktex results. The meter weight of the reinforcing rope of this invention is 4.45 ktex whereby the proportion of steel amounts 93% and the meter weight of steel wires content in the reinforcing rope of this invention amounts to 3.69 ktex.

Since, as discussed before, by coiling steel wires of a rectangular cross-section the maximum breaking force remains approximately the same whereby the maximum or breaking elongation is simultaneously increased, the share of breaking force or tensile strength of steel wires in the overall strength of the rope of this invention must equal the product of meter weight of steel wires in the rope times the specific breaking strength of the comparison rope made entirely of steel wires. The breaking force of approximately rectangular steel wires in the reinforcing rope of this invention must therefore amount to $3.69 \times 227 = 1023N$ (Table II: specific breaking strength of comparison rope of steel wires equals 320 N/ktex, meter weight of the reinforcing rope of this invention equals 5.9 ktex, whereby the proportion of steel is 81%; meter weight of rectangular steel wires in the reinforcing rope of this invention is 4.78 ktex, the share of breaking force of approximately rectangular steel wires in the rope of this invention is 1530N. While the adding of breaking forces of the two components of the rope of this invention produces 2223N (1200N of the aramid component plus 1023N of the steel component) the actual breaking force of the reinforcing rope of this invention is indicated in Table I amounts to 2400N. In Table II 1800N of aramid components plus 1530N of steel component equals 3330N in comparison with the actual value 3500N of the breaking force of the rope of this invention.

Tables I and II also indicate for respective reinforcing ropes or cords their values of permeability to air when embedded in vulcanized rubber, as well as their bending stiffness. The bending stiffness has been measured according to the method described in Bisfa, "Internationally Agreed Methods for Testing Steel Tire Cords", 1981, chapter II, determination of stiffness.

The permeability to air in vulcanized condition is a measure for the quality of embedding of a reinforcing rope or reinforcing cord in rubber. The testing method of the air permeability in vulcanized condition is described in connection with FIGS. 9 and 10.

Figure 9:
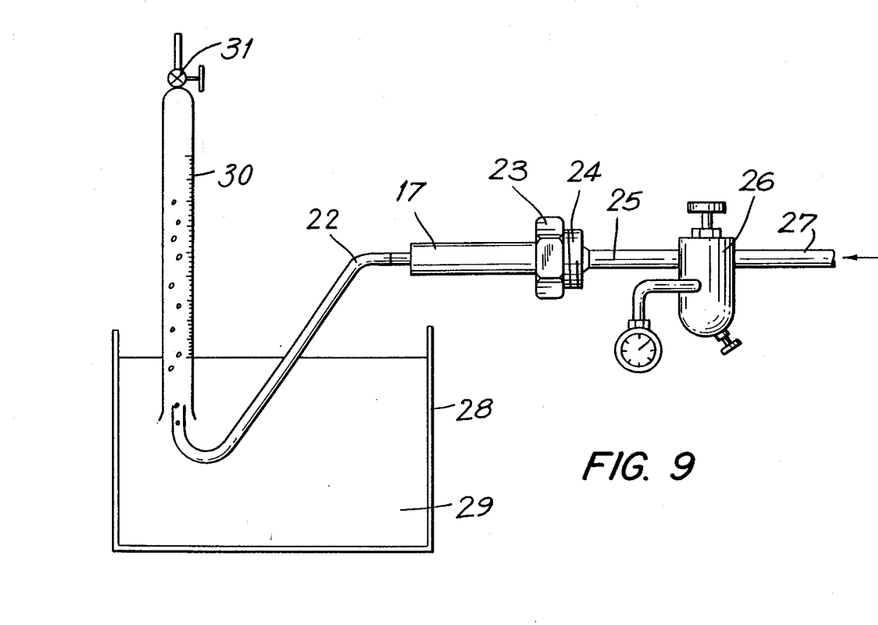
FIG. 9 shows schematically a testing device for measuring permeability to air of a reinforcing rope of this invention embedded in an elastomeric material.
Figure 10:
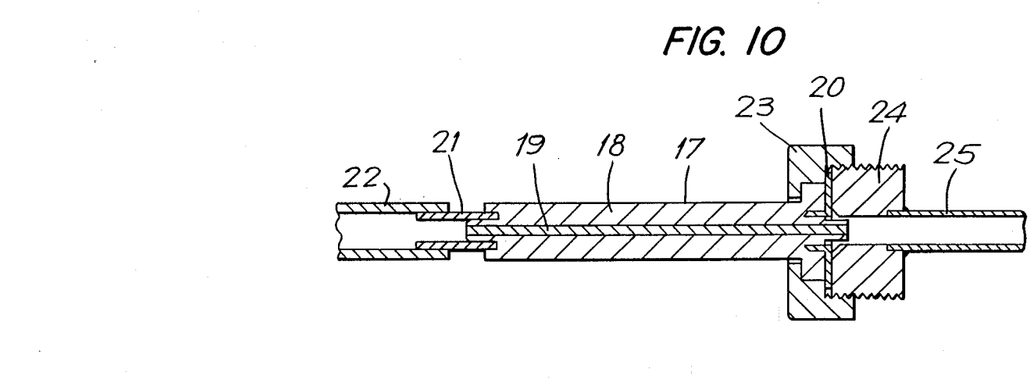
FIG. 10 is an axiaal section of a testing body for determining permeability to air in the device of FIG. 9.

For this purpose, a 7.5 cm long piece of reinforcing rope 19 is embedded in rubber 18 whereby the ends of the rope 19 are exposed at both end faces of the resulting besting body 17. At the same time a sealing ring 20 and a tubular connecting piece 21 are embedded in rubber 18 around the end portions of the rope 19. By means of a union nut 23, the testing body 17 is hermetically connected via a connection piece 24, conduit 25, a pressure reducing valve 26 and a pressure conduit 27 to a non-illustrated source of pressure air. A U-shaped tube 22 is hermetically connected to the tubular connection piece 21 and immersed at its free end in a body of water 29 in a container 28. The upwardly directed free end of the tube 22 opens in a measuring cylinder 30 which at the beginning of the test is filled with water up to the zero mark on its measuring scale. The open bottom of the measuring cylinder 20 is also immersed in the body of water 29. At the start of the measurement of the air permeability of the embedded rope, the air pressure is adjusted by the pressure reducing valve 26 to 1 bar. In the case when due to an imperfect embedding of the reinforcing rope 19 in the rubber bath 18, air starts leaking through the rope, then the air bubbles are collected in the measuring cylinder 30 and the rate of the accumulation (the air quantity per time unit) is measured.

reinforcing rope) is almost twice as large as that of the rope made of steel wires only. The permeability to air in vulcanized condition is zero, that means the embedding of the reinforcing rope of this invention in rubber is perfect. The bending stiffness of the rope of this invention is very small and therefore the installation of reinforcing ropes of this invention in the pneumatic tires is simplified. As evident from the stress-elongation curves of FIGS. 5 and 6 pertaining to the ropes specified in Tables I and II, a proportion D of the curve indicating an elongation D which is subject to the construction of the rope is negligable. The proportion D of the overall elongation in both examples of the rope of this invention is less than 0.1%.

If the aramid filaments in the rope of this invention are soaked before their installation with a lubricant, an

TABLE I

|  |  | reinforcing rope acc. to the invention | Comparison: standard rope of steel wires | Comparison: cord of round filaments |
|---|---|---|---|---|
| designation of construction |  | 4 × 1680 Ar + 12 × 0.22 | 3 × 0,20 + 6 × 0.38 | 8 × 1680Ar |
| steel wire (cross-section) |  | 0.22 mm 0.17 mm | round wire | — |
| number of steel wires |  | 12 | 9 | — |
| twists or windings per m of steel wires |  | 70 S | 100 S/50 Z | — |
| structure of aramid-filaments |  | 4 × 1680dtex f 1000 | — | 8 × 1680dtex f 1000 |
| helical twists per m of aramid filaments |  | 50 Z/140 S | — | 50 Z/140 S |
| weight ratio round steel wires | %/% | 17/83 | 0/100 | 100/0 |
| tensile strength | N | 2400 | 1700 | 2400 |
| m weight | ktex | 4.45 | 6.14 | 1.4 |
| specific tensile strength | N/ktex | 539 | 277 | 1714 |
| rope diameter | mm | 1.23 | 1.18 | 1.40 |
| rope strength per diameter | N/mm | 1951 | 1440 | 1714 |
| breaking elongation | % | 3.1 | 2.0 | 3.2 |
| permeability for air in vulcanized condition | ml/min | 0 | 25 | 0 |
| bending strength | S.U. | 48 | 170 | 0.1 |

TABLE II

|  |  | reinforcing rope acc. to the invention | Comparison: standard rope of steel wires | Comparison: cord of round filaments |
|---|---|---|---|---|
| designation of construction |  | 3 × 2 × 1680 Ar + 12 × 0.25 F+ | 3 + 9 + 15 × 0.22 + 0.19 | 3 × 4 × 1680 Ar |
| steel wire (cross-section) |  | 0.25 mm  0.15 mm  0.15 mm  0.10 mm | round wire | — |
| number of steel wires |  | 12 × 0.25 F  1 × 0.15 F | 27 × 0.22 round  1 × 0.15 round | — |
| twists per m of steel wires |  | 50 S/ | 16 S/83 S/56 Z | — |
| structure of aramid-filaments |  | 6 × 1680 dtex f 1000 | — | 12 × 1680 dtex f 1000 |
| helical twists per m of aramid filaments |  | 50 Z/60 S/110 S | — | 50 Z/60 S/60 S |
| weight ratio round steel | %/% | 19/81 | 0/100 | 100/0 |
| tensile strength | N | 3500 | 2700 | 3600 |
| m-weight | ktex | 5.9 | 8.44 | 2.10 |
| specific tensile strength | N/ktex | 593 | 320 | 1714 |
| rope diameter | mm | 1.7 | 1.6 | 1.75 |
| rope strength per diameter | N/mm | 2059 | 1688 | 2057 |
| breaking elongation | % | 3.1 | 1.95 | 3.15 |
| permeability for air in vulcanized condition | ml/min | 0 | 80 | 0 |
| bending strength | S.U. | 94 | 120 | 0.1 |

From the above Tables it is evident that by means of this invention a reinforcing rope is provided which has the advantages both of an aramid cord and of a steel wire cord. The reinforcing rope contains 10–40% by weight, preferably 15–25% by weight of aramid (i.e. aromatic polyamide) filaments. The overall strength related to the diameter of the reinforcing rope corresponds to that of a pure aramid cord. The specific breaking strength (related to the meter weight of the excellent resistance against fatigue is obtained in the finished reinforcing rope. In other words, a premature occurrence of breakage in aramid cords due to fatigue is prevented by soaking in the filaments in a lubricant.

It will be understood that each of the elements described above, or two or more together, may also find a useful application in other types of construction differing from the types described above.

While the invention has been illustrated and described as embodied in specific examples of reinforcing ropes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the following appended claims:

1. A reinforcing rope comprising at least two components, a first component consisting of steel wires and the second component consisting of filaments of aromatic polyamides, the filaments forming a core around which the steel wires are coiled, each steel wire having a substantially rectangular cross-section defining opposite broad and narrow sides and having rounded corners, and the respective coiled steel wires being twisted along their longitudinal axes such that a broad side of each wire engages in a circumferential direction a corresponding peripheral portion of the core.

2. A reinforcing rope as defined in claim 1 having a substantially circular cross-section.

3. A reinforcing rope as defined in claim 1 wherein said steel wires are coiled around said core with 40 to 200 windings per meter.

4. A reinforcing rope as defined in claim 3 wherein said opposite narrow sides of the steel wires are rounded and the narrow sides of adjoining steel wires contact each other substantially along a line.

5. A reinforcing rope as defined in claim 4 wherein the number of said steel wires is between five and thirty.

6. A reinforcing rope as defined in claim 5 comprising twelve steel wires.

7. A reinforcing rope as defined in claim 5 comprising eighteen steel wires.

8. A reinforcing rope as defined in claim 5 comprising twenty-four steel wires.

9. A reinforcing rope as defined in claim 1 wherein the cross-sectional area of each steel wire is between 0.03 and 0.2 mm$^2$.

10. A reinforcing rope as defined in claim 1 wherein the ratio between the broad and narrow sides of each steel wire is between 1 and 4.

11. A reinforcing rope as defined in claim 1 wherein the filaments of aromatic polyamide are twisted into at least one yarn.

12. A reinforcing rope as defined in claim 11 wherein said filaments are twisted into a plurality of yarn, said yarns being further twisted with one another whereby the direction of twisting of the filaments in a yarn is opposite to the twisting direction of the yarns, and the number of twists per a length unit of said yarns being greater than that of said filaments.

13. A reinforcing rope as defined in claim 12 wherein the difference between said twists per a length unit is between 50 to 200 twists per meter.

14. A reinforcing rope as defined in claim 11 wherein the steel wires are coiled in the direction of twisting of said yarn.

15. A reinforcing rope as defined in claim 1 comprising 10 to 40% by weight of said filaments of aromatic polyamide.

16. A reinforcing rope as defined in claim 1 comprising 15 to 25% by weight of said filaments of aromatic polyamide.

17. A reinforcing rope as defined in claim 1 further comprising a wrapping wire coiled around said steel wires.

18. A reinforcing rope as defined in claim 17 wherein said wrapping wire is a steel wire of a rectangular configuration having rounded edges.

19. A reinforcing rope as defined in claim 1 having a specific tensile strength between 500 and 900 N/ktex.

* * * * *